United States Patent [19]

Dillman

[11] Patent Number: 4,465,420

[45] Date of Patent: Aug. 14, 1984

[54] SELF-ERECTING PORTABLE PAVING MIX SILO

[75] Inventor: Bruce A. Dillman, Cape Coral, Fla.

[73] Assignee: Bituma-Stor, Inc., Marquette, Iowa

[21] Appl. No.: 354,218

[22] Filed: Mar. 3, 1982

[51] Int. Cl.³ ............................................... B60P 1/56
[52] U.S. Cl. ...................................... 414/332; 52/119;
52/194; 414/919
[58] Field of Search ............... 414/328, 332, 787, 919;
52/116, 119, 192, 194, 197

[56] References Cited

U.S. PATENT DOCUMENTS

| | | | |
|---|---|---|---|
| 3,666,129 | 5/1972 | Haskins | 414/919 X |
| 3,934,739 | 1/1976 | Zumsteg et al. | 414/332 |
| 3,985,254 | 10/1976 | Grandury | 414/919 X |
| 4,026,441 | 5/1977 | Jones | 414/332 X |
| 4,163,626 | 8/1979 | Batterton et al. | 414/919 X |
| 4,249,351 | 2/1981 | Brock | 414/332 X |

FOREIGN PATENT DOCUMENTS

406943  1/1966  Switzerland ........................ 52/197

*Primary Examiner*—Robert J. Spar
*Assistant Examiner*—Ken Muncy
*Attorney, Agent, or Firm*—James E. Nilles; James R. Custin

[57] ABSTRACT

A self-erecting silo assembly comprises a horizontally elongated trailer frame and a cylindrical paving mix bin that overlies the frame when in a horizontal transport position, with its front side lowermost and its top end near a front end of the frame. Rear legs on which the bin is supported when erected are rigidly connected to the bin; front legs have their upper ends pivoted to the bottom of the bin. A detachable bin connection between the bin and the frame defines a horizontal axis about which the bin is swung up from transport position to an inclined intermediate position at which detachable leg connections are made between the rear legs and the frame. The bin connection is then disconnected, the bin is swung up to upright position about the leg connections, and the bottom ends of the front legs are connected to the frame. Jack cylinders having upper ends connected to the bin have lower ends connected to the frame at a forward location for raising the bin to intermediate position and at a more rearward location for raising the bin to upright position. A slat conveyor elevator comprising a separate trailer has its front end hoisted to the top of the erected bin by cables extending from a winch on the front of the bin frame, across the top of the bin, and to the front of the elevator unit, which is guided during hoisting by rollers on it, engaged in a track extending up the rear side of the bin.

11 Claims, 11 Drawing Figures

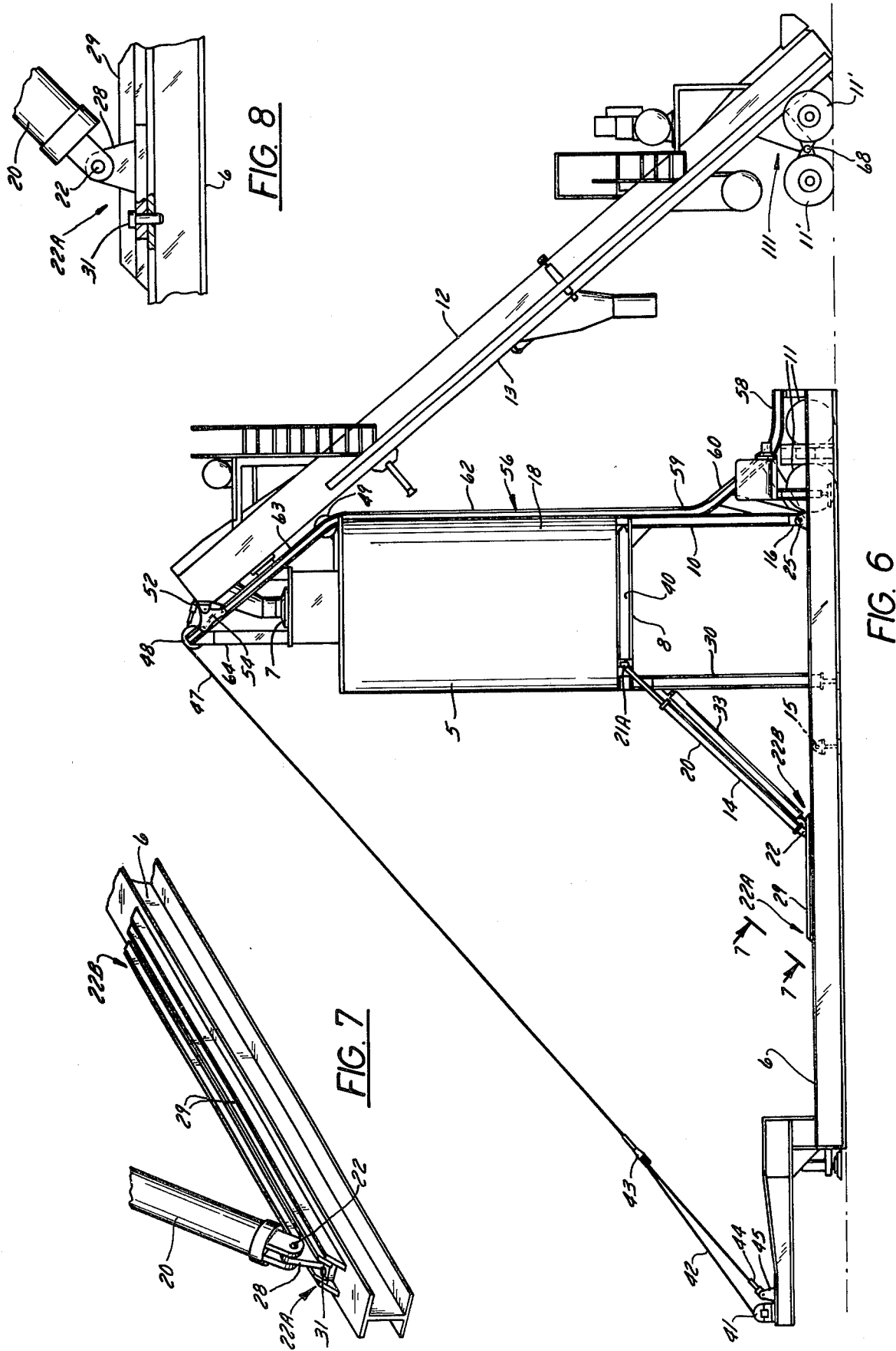

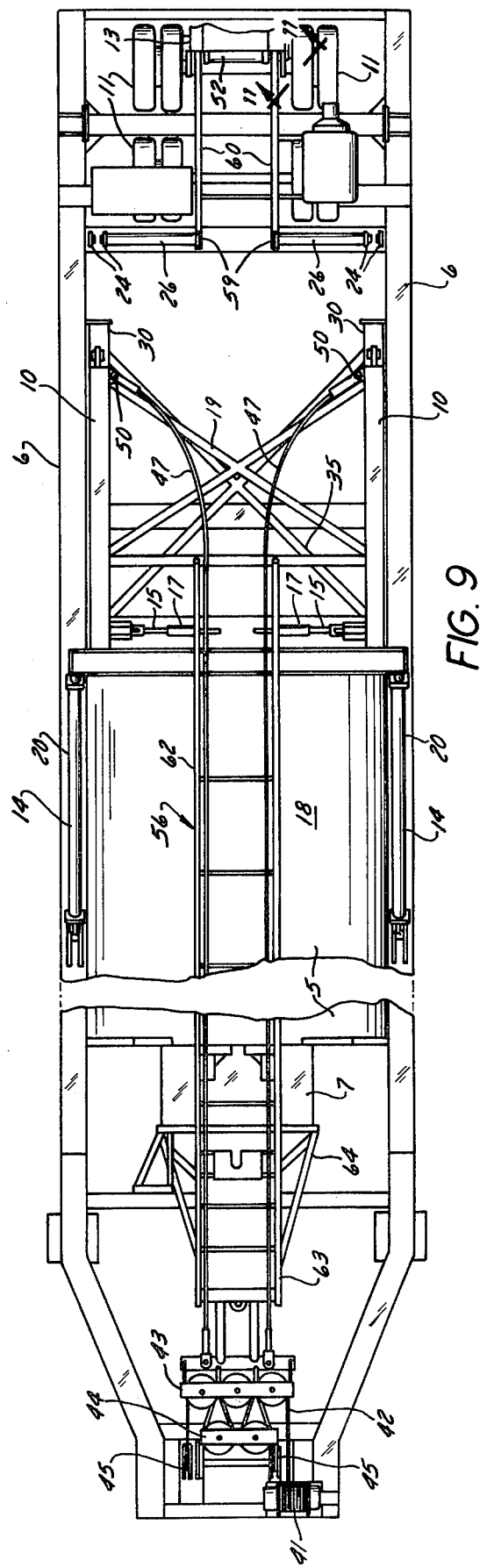
FIG. 9
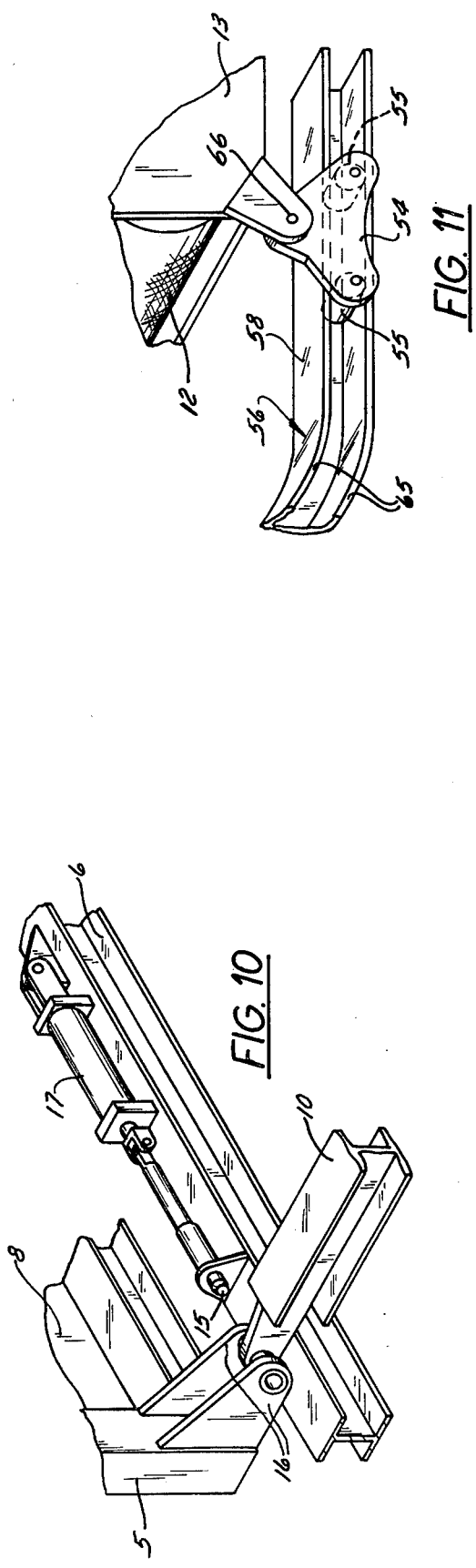
FIG. 11
FIG. 10

SELF-ERECTING PORTABLE PAVING MIX SILO

FIELD OF THE INVENTION

This invention relates to a portable silo for storage of paving mix aggregates and the like, of the type comprising a substantially cylindrical bin that has an inlet in an upper end thereof and an outlet in a lower end thereof, legs that support the bin at an elevation high enough for dump body vehicles to be driven under it for loading, and an inclined conveyor-like elevator that carries materials up over the top of the bin for filling the bin through its inlet; and the invention is more particularly concerned with a portable silo of the character described that is self-erecting and can therefore be converted from its transport condition to its operating condition, or vice versa, without the need for a crane.

BACKGROUND OF THE PRIOR ART

Paving aggregate silos—sometimes referred to as surge bins—are employed in connection with large scale paving operations, where paving mix is prepared at a mixing plant and is hauled to the paving site in dump body vehicles. The mixer at the central plant discharges batches of mix from time to time, but it is impracticable to so schedule mixing and vehicle operation that the mixer can discharge each batch of mix into a waiting vehicle. Therefore the freshly mixed material is carried directly from the mixer into a silo, and vehicles are loaded from the silo.

A mixing plant used for large scale paving operations should preferably be portable, so that upon completion of one paving project it can be transported to the site of a new one. Obviously the rather high and bulky silo cannot be moved from place to place while in its upright operating position, and therefore it has to be tilted down to a horizontal position for transport and swung back up to its upright position at the new site. Setting up and taking down the silo involves manipulation not only of the storage bin itself but also of the rather long conveyor-like elevator that carries material up from the mixer to the inlet in the top of the bin.

Self-erecting silos are available that are so arranged as to be transportable on a single chassis which carries both the bin and the elevator. Heretofore, however, such self-erecting silos have been unsatisfactory because they were necessarily of rather light construction and lacked such desired features as heavy duty floor systems, heavy duty elevator chains and heavy bearings. More sturdily built portable silos, which had to be transported on two or more transport units, had to be erected and taken down with the aid of a crane.

This need for a crane was not just an inconvenience but a matter of very substantial expense. The cost of a crane represents too large a capital investment to justify owning it for the infrequent occasions when a mixing plant is to be taken down and set up, and renting a crane can involve complicated problems of scheduling, liability coverage and transport of the crane to and from the plant site, in addition to the high cost of crane rental itself.

What has been needed, therefore, is a portable silo which has the necessary sturdiness and heavy duty construction for long-continued trouble-free operation but which can be set up and taken down without the need for a crane.

An obvious problem involved in devising a self-erecting heavy-duty silo is that of providing a mechanism by which the long, bulky and heavy storage bin can be swung between its horizontal transport orientation and its upright operative position. This problem is complicated by the need for having the silo rest on long, sturdy legs when in its operating condition, so that its bottom end is elevated high enough to permit dump-body vehicles to be driven under it for loading. If the silo is not to be lifted by means of a crane that pulls it to its upright position, the most practical expedient for raising it is a hydraulic cylinder jack mechanism that pushes it up.

A hydraulic cylinder can exert a substantially high thrust through a fairly substantial distance, but commercially available hydraulic cylinder jacks have been regarded as incapable of extension and retraction through the very considerable distances needed for raising and lowering a paving mix silo. Calculations for one contemplated arrangement for a heavy-duty self-erecting silo showed that it would need a hydraulic cylinder with a stroke of about 21 feet. Engineers experienced in the design of hydraulic cylinders pointed out that a unit of such extreme length would be impractical and inadvisable, especially since the cylinder would not be operating in a vertical position and would therefore be subjected to bending loads that would severely deflect it.

Of course any self-erecting silo arrangement must meet certain requirements in addition to the basic capability for being put up and taken down with self-contained mechanism that is transported on the vehicle units that carry the silo assembly. Safety is a paramount consideration, inasmuch as putting up the silo and taking it down involve the movement of very heavy and bulky objects through large distances. The mechanism employed for setting up and taking down the silo must of course be compact so that it can fit onto the carrying vehicle, along with the silo elements themselves, without exceeding load limits that are fixed by law. And while meeting these stringent requirements, the mechanism that is used only for setting up and taking down the silo must be as inexpensive as possible, so that its share of the total cost of the assembly does not represent a large capital investment that stands idle most of the time.

SUMMARY OF THE INVENTION

The general object of the present invention is to provide a portable silo or surge bin of the character described which is of sturdy, heavy-duty construction in all respects but is nevertheless self-erecting, and which is set up and taken down with the aid of compact, inexpensive and readily available actuating devices that are mounted on the chassis units which carry the elements of the silo structure.

It is also an object of this invention to provide a sturdy and heavy-duty but portable and self-erecting silo comprising a storage bin which is transported on one chassis unit and an elevator or slat conveyor which is transported on a second chassis unit, which silo can be completely erected and placed in operation, or completely taken down and brought to transport condition, without the need for a crane and in a period of about an hour.

A more specific object of the invention, but a very important one, is to provide a self-erecting portable silo assembly of the character described wherein conventional, commercially available double-acting hydraulic cylinder jacks are employed to move the storage bin between a horizontal transport position and an upright operating position in which the bin is mounted on supporting legs.

Another specific but important object of the invention is to provide a portable, self-erecting silo assembly of the character described wherein a chassis unit upon which the elevator or slat conveyor is transported serves as the frame of the elevator itself, and wherein simple and readily available means are employed for raising the elevator to its operative position relative to the bin.

It is also an object of the invention to provide a heavy-duty self-erecting silo for storage of paving aggregates and the like which achieves the objectives set forth above and which, in addition, is compact, inexpensive and safe.

BRIEF DESCRIPTION OF DRAWINGS

In the accompanying drawings, which illustrate what is now regarded as a preferred embodiment of the invention:

FIG. 6 is a view in side elevation of the silo assembly fully erected and in operative condition;

FIG. 7 is a detail perspective view on an enlarged scale, showing the lower connection means for one of the bin raising jacks, as seen in the direction designated by 7—7 in FIG. 6;

FIG. 8 is a fragmentary view in longitudinal section through the lower jack connection means shown in FIG. 7;

FIG. 9 is a plan view of the bin transport chassis unit with the bin in its transport position;

FIG. 10 is a detail perspective view of the means by which the bin is releasably connected with its frame when the bin is at and between its transport and intermediate positions; and FIG. 11 is a detail perspective view of a carriage on the front end of the elevator, as seen in the direction designated by 11—11 in FIG. 9.

DETAILED DESCRIPTION OF PREFERRED EMBODIMENT OF THE INVENTION

Figure 1:
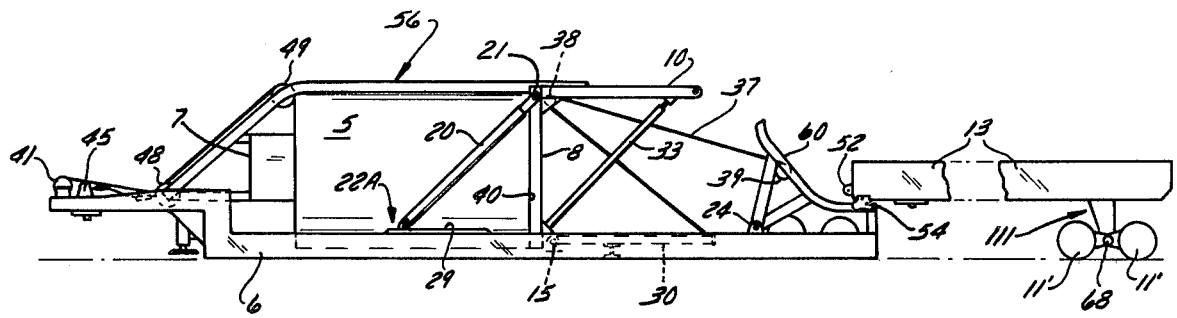
FIG. 1 is a more or less diagrammatic view in side elevation of a silo assembly embodying the principles of this invention, shown in its transport condition.

In general, a portable self-erecting silo assembly that embodies the principles of this invention comprises a substantially cylindrical bin 5 which is at all times carried by a horizontally elongated bin frame 6 that can be a trailer chassis of the low-boy type. In a transport condition (FIG. 1) of the bin 5, in which its axis is horizontal, it overlies the frame 6 to be supported thereby, and a top end 7 of the bin is near the front end of the frame while its bottom end 8 is near the rear of the frame. When the silo assembly is erected and in operating condition (FIG. 6), with the bin axis upright, the frame 6 serves as a foundation for upright legs 10, 30 that support the bin 5 at an elevation high enough to allow dump trucks to be driven under it for loading from an outlet (not shown) in its bottom. It will be understood that the frame 6 will be supported for transport on wheels 11 at its rear, but the wheels will be retracted or removed at an operating site so that the frame can rest flat on the ground to provide a stable footing for the erected silo.

The silo assembly also comprises a slat conveyor or elevator 12 by which paving mix, concrete aggregate or other material to be stored in the bin 5 is filled into an inlet (not shown) in its top end 7. A frame 13 of the elevator 12 comprises a second low-boy trailer chassis, the front end of which overlies the top end 7 of the bin 5 when the silo assembly is in its operating (FIG. 6) condition.

As will appear from the following description, the complete assembly comprising the self-erecting silo of this invention is transported on the two chassis units 6 and 13 that comprise the bin frame and the elevator frame, respectively. At the operating site where the silo is to be erected, the elevator unit is first placed at a position selected for it, and the bin unit is then backed into place, with its longitudinal centerline aligned with that of the elevator unit and with its rear end closely adjacent to the front end of the elevator unit. By means of hydraulic outriggers 14 on the bin frame 6, or in any other suitable manner, the wheels 11 of the bin unit are retracted or removed, and the frame 6 is lowered to the ground. After firm support has been established for the bin frame 6 and it has been leveled both longitudinally and laterally, the erecting procedure can begin.

When the bin 5 is in its horizontal transport position, it has a rear side 18 uppermost, its rear side being the one that faces the elevator 12 when the silo is erected. In its transport position, the bin 5 has a releasable connection to the frame 6, comprising coaxial pins 15 which are supported by the frame and which engage in bored lugs 16 (FIG. 10) on the bottom end 8 of the bin 5, adjacent to its then-lowermost front side. One of these pins 15 is located at each side of the frame 6, and each preferably has a coaxial connection with the piston of a small double-acting hydraulic cylinder actuator 17 whereby the pin 15 can be axially inserted into its lug 16 on the bin 5 or axially withdrawn from engagement in its lug. The coaxial pins 15, when engaged in their lugs 16, define a horizontal swinging axis for the bin, which extends transversely to the bin axis and to the length of the bin frame 6 and which is adjacent to the frame 6 and to the bottom end of the bin 5. The bin can be tilted upwardly to a substantial extent about this swinging axis, as explained hereinafter.

Secured to the bottom portion of the bin 5, adjacent to its rear side 18, is a rear supporting structure than can comprise a pair of rear legs 10 and diagonal bracing struts 19 that extend between them. Preferably the rear legs 10 are permanently and rigidly fastened to the bin 5, although they could be removable or could be pivoted to the bin to swing down when the bin is in its transport position. In any case, when erection of the bin 5 is about to start, the rear legs 10 will be in rigid relation to the bin 5, extending substantially parallel to the bin axis and projecting towards the rear of the frame 6, as shown in FIG. 1.

The bin 5 is swung between its horizontal transport position and its upright erected position by means of a pair of sturdy, double-acting hydraulic cylinder jacks 20 that are located at opposite sides of the bin frame 6 and have their axes parallel to one another. At an upper end of each of these bin raising jacks 20 it has a pivotal connection 21 with the bottom portion of the bin 5. Each connection 21 is shiftable forwardly and rearwardly along the bottom of the bin, as explained hereinafter, but during raising and lowering of the bin it is locked in a position near the rear side 18 of the bin.

At its lower end each bin raising jack 20 has a pivot connection 22 with the frame 6 that is shiftable so that it can be established at either of two locations 22A, 22B that are spaced different distances forwardly along the frame from the swinging axis defined by the pins 15.

When the bin 5 is to be swung between its transport position (FIG. 1) and an intermediate position (FIG. 2) in which the bin axis is inclined to the horizontal, the lower end of each bin raising jack is connected to the frame at the more forward location 22A. As so connected, each of the jacks 20 extends obliquely upwardly from the frame and rearwardly relative to it at an angle of about 45° to the horizontal. From a comparison of FIGS. 1 and 2 it will be seen that as each jack 20 extends to swing the bin 5 up to its intermediate position, the upper end of the jack moves in an arc about the swinging axis of the pins 15 and has a mainly rearward motion.

Figure 2:
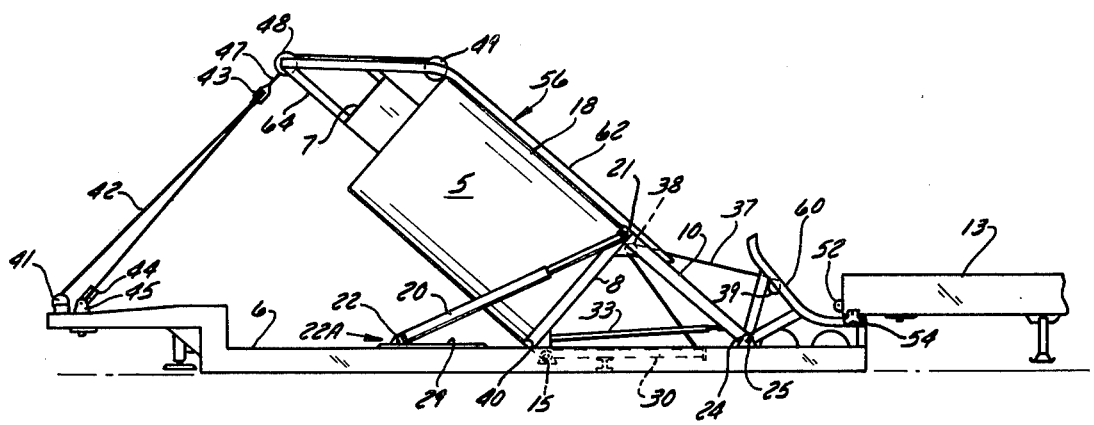
FIG. 2 is a view generally similar to FIG. 1 but showing the assembly in a first stage of erection, when the bin has been brought to an intermediate position in which its axis is inclined to the horizontal.

When the bin 5 arrives at its intermediate position shown in FIG. 2, the bottom ends of its rear legs 10 are in juxtaposition to lugs 24 on the frame 6, near its rear end, to which the legs 10 are then connected by means of pins 25. The leg connection pins 25 are arranged similarly to the pins 15 that define the swinging axis of the bin, in that the pins 25 are at opposite sides of the frame and coaxial with one another, and each is coaxially connected with the piston of a hydraulic actuator 26 that is mounted on the frame 6, in an arrangement generally like that shown in FIG. 10, whereby the pin 25 is movable into and out of connected relationship with its bin leg 10.

With the pins 25 connected to the rear legs 10, and the bin itself still connected to the frame 6 by the pins 15, the bin is securely but releasably locked in its intermediate position, and the lower end connections 22 of the bin raising jacks 20 can be shifted from their more forward locations 22A to their rearward locations 22B, in preparation for raising the bin all the way to its upright position. Such shifting is readily accomplished because the pivotal connection 22 at the lower end of each jack 20 is at a shoe 28 that is slidable in a channel-section track 29 whereby the shoe is guided for movement between the two locations 22A, 22B. The shoe 28 can be releasably secured at each location by means of a bolt or anchor pin 31 (FIG. 8) which is receivable in a vertical hole in the shoe that aligns with a vertical hole in the frame at each location.

When the rear legs 10 have been secured to the frame 6 by means of the leg retaining pins 25, as described above, the vertical anchor pins 31 are removed from the shoes 28, and each of the bin raising jacks 20 is then retracted so that its shoe 28 slides rearwardly in its track 29 until the shoe reaches the rearward location 22B, where the shoe is secured by re-insertion of the anchor pin 31. Thereafter the pins 15 that define the swinging axis of the bin are withdrawn from engagement with the bin lugs 16. This done, the bin raising jacks 20 are again extended, to swing the bin 5 all the way to its upright position about the horizontal axis defined by the leg retaining pins 25. This brings the assembly to the condition shown in FIG. 4, wherein the bin 5 rests on its rear legs 10 and is supported against tilting by the extended bin raising jacks 20.

Figure 3:
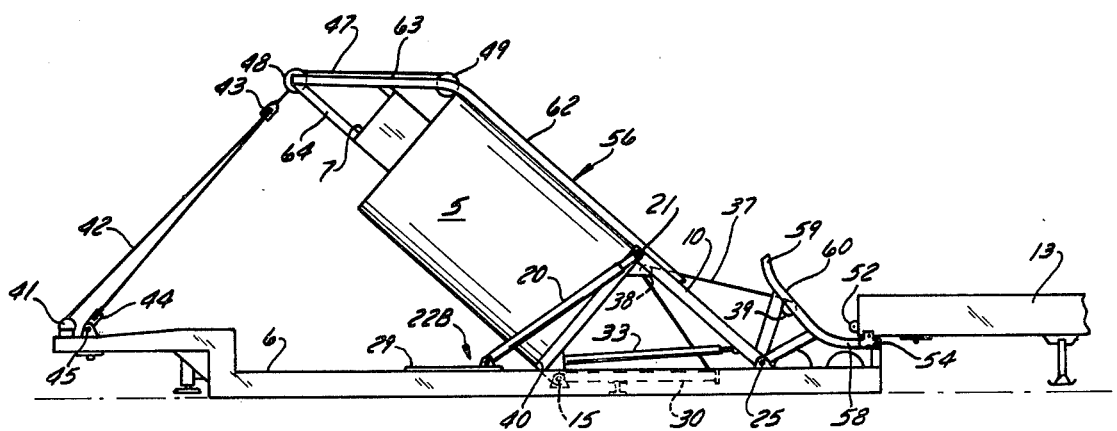
FIG. 3 is a view generally similar to FIG. 2 but showing the hydraulic cylinder jacks shifted to their positions in which they effect movement of the bin between its intermediate position and its erected upright position.
Figure 4:
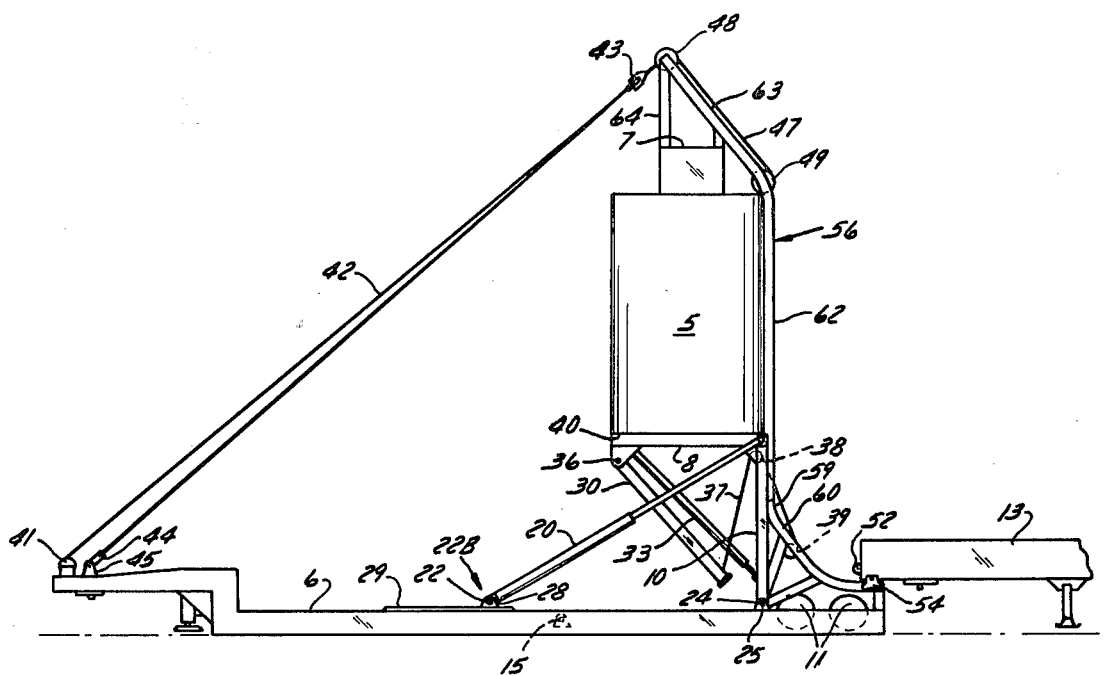
FIG. 4 is a view generally similar to FIGS. 1-3 but showing the bin fully in its upright position and just before the front legs have been brought into supporting relation to it.

Without further bracing, as is apparent from FIG. 4, the weight of the bin 5 would at this time be supported only at its rear side, where the rear legs 10 and the upper ends of the bin raising jacks 20 have their respective connections to the bottom of the bin. However, to provide for a sturdier and more stable support of the bin, the assembly preferably includes a pair of diagonal brace struts 33, each removably connected between a lower end portion of one of the rear legs 10 and the bottom of the bin 5 near the front side of it. These diagonal brace struts 33 can remain in place when the bin is in its transport position (FIG. 1), to support the rear legs 10 against downward deflection under the influence of road bumps, and when the bin is swung between its transport and its upright positions (as is apparent from FIGS. 2–4) they stiffen the rear legs 10 to help them support the deflecting loads to which they are then subjected.

When the bin 5 has been brought to its upright (FIG. 4) position, front legs 30 can be installed between the bottom of the bin and the frame 6, to cooperate with the rear legs 10 in supporting the full weight of the bin and holding it upright. As with the rear legs 10, the two front legs 30 are connected with one another by diagonal braces 35 that unify them into a front support for the bin.

In the preferred arrangement, the upper ends of the front legs 30 have a permanent connection 36 to the bottom of the bin, adjacent to the front side of the bin, and this connection 36 is arranged to allow the front legs to swing freely relative to the bin about a horizontal transverse axis. Because of their pivotal connection 36 to the bin, the front legs 30 extend horizontally rearwardly, parallel to the frame 6, when the bin 5 is in its horizontal transport position (FIG. 1), and they remain in that horizontal attitude while the bin is swung up (FIGS. 2 and 3) to its inclined intermediate position.

As the bin 5 is swung between its intermediate (FIGS. 2 and 3) position and its upright (FIG. 4) position, the lower ends of the front legs 30 could drag on the ground or on the frame 6 if swinging of those legs were not restrained. Therefore, a cable 37 is connected to the lower end of each front leg 30, and it extends over an idler sheave 38 between the rear legs 10, near the bottom of the bin, to a small winch 39 that is mounted on the rear of the frame 8. While the bin is being swung between its intermediate and its upright positions, the winch 39 is so operated as to maintain the bottoms of the front legs at a level above the frame, as will be understood from FIG. 4.

Figure 5:
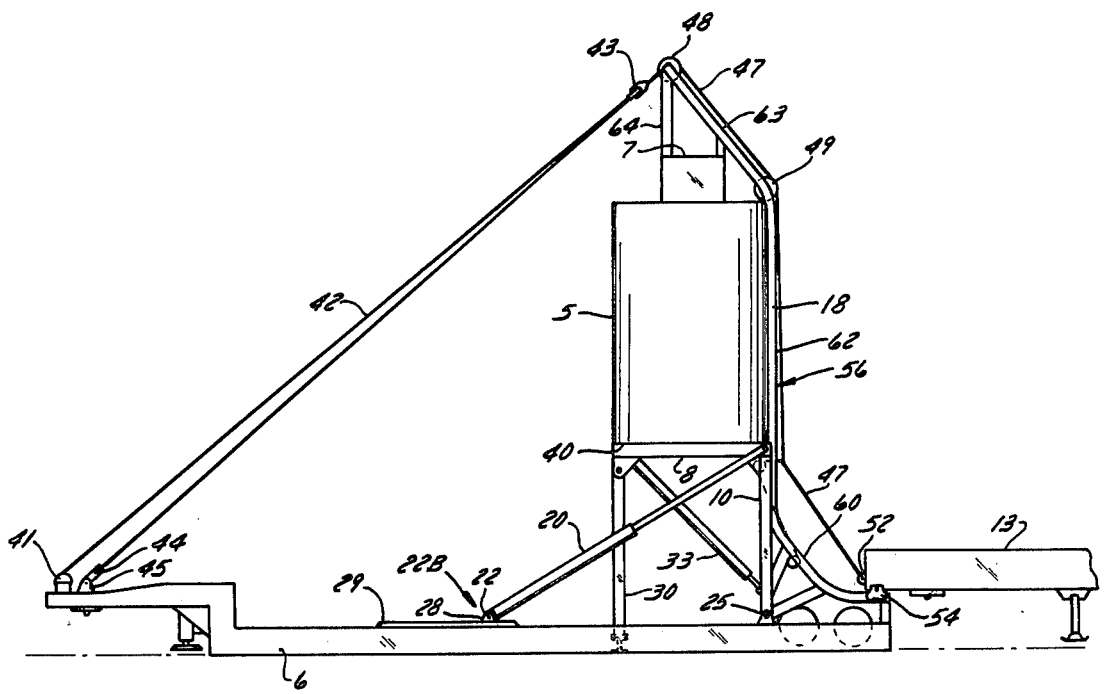
FIG. 5 is a view generally similar to FIG. 4 but showing the bin in its upright position, supported on its legs, and the assembly in a condition of readiness for raising the elevator to its operative position.

When the bin 5 has been brought all the way to its upright (FIG. 4) position, tension on the leg control cable 37 is released, and the front legs 30 are brought to an upright position wherein the bottoms of those legs can be secured to the frame 6, as shown in FIG. 5. The cable 37 can then be disconnected from the front legs and wound up onto the winch 39 for storage.

At this stage the diagonal brace struts 33 can be removed from the positions between the pairs of legs 10 and 30 and can be reconnected, as shown in FIG. 6, so that they extend obliquely upwardly and rearwardly from the frame 6 to upper portions of the front legs 30, where they brace the bin against fore-and-aft sway. It will be understood that suitable fittings for the detachable connection of the brace struts 33 are provided on the frame 6 and on the front legs 30. At this stage, too, the upper pivotal connections 21 between the bin raising jacks 20 and the bin 5 are shifted from their locations near the rear of the bin, which they occupy when the jacks are used for swinging the bin, and are brought to stowage positions 21A near the front side of the bin, as shown in FIG. 6. Each of the upper jack connections 21 can be generally similar to the above described lower jack connections 22, comprising a shoe slidable in a channel-section track 40 that extends fore-and-aft along the bottom of the bin.

It will be observed that when the bin is fully erected, as shown in FIG. 6, the space beneath the bin and between the front and rear pairs of legs 30 and 10 is unobstructed, so that trucks can be driven through that space for loading from the outlet at the bottom of the bin. It will be understood that a platform will be placed between the longitudinal members of the bin frame 6, with its surface at the level of the tops of those members, and that there will be an inclined ramp (not shown) at each side of the frame to enable trucks to drive across that platform and the frame members.

When the bin is fully erected, the elevator 12 can be hoisted to its operative position. The power mechanism for erecting the elevator comprises a relatively large winch 41 mounted on the front end of the bin frame 6. A winch cable 42 extends from the winch 41, around pulleys on upper and lower bails 43, 44, and back down to an anchor point 45 near the winch 41, to enable that winch to exert a high tension force on the upper bail 43. Elevator hoisting cables 47 extend from the upper bail 43, around sheaves 48, 49 on the top of the bin, and thence down along the rear side of the bin. When the bin is in its transport position, the free ends of the elevator hoisting cables 47 can be detachably connected to stowage connections 50 on the rear legs 10, near their bottom ends, as shown in FIG. 9. As the bin is erected, the winch 41 must be operated to pay out the winch cable 42 in step with raising of the bin.

After the bin is erected, the elevator hoisting cables 47 are detached from their stowage connections 50 and are attached to connecting eyes 52 on the front of the elevator frame 13 so that the large winch 41 can be employed for lifting the elevator 12 to its operative position shown in FIG. 6. Attached to each side of the elevator frame 13, at its front end, is a carriage 54 having a pair of rollers 55 that are guidingly engaged in an elevator guide track 56 as the front end of the elevator is pulled up to the top of the bin. A lower portion of the elevator guide track 56, fixed directly to the rear end portion of the bin frame 6, has a lowermost horizontal entry section 58, a short vertical upper section 59, and an intermediate section 60 that provides a smooth, gradual transition between the entry section 58 and the vertical section 59. The remainder of the elevator guide track 56 is secured to the bin 5 itself and comes into its operative position when the bin attains its upright position. With the bin erected, this further portion of the elevator guide track 56 has a long vertical stretch 62 that extends up the rear side of the bin and forms an upward continuation of the upper section 59 of the entry portion, and said vertical stretch 62 continues into an inclined stretch 63 that extends obliquely upwardly and rearwardly across most of the top end 7 of the bin and the inlet therein, being supported by a mast 64 that projects up from the top of the bin. The mast 64 also supports the upper sheaves 48 over which the elevator hoisting cables 47 are trained. The lower sheaves 49 for those cables are mounted on the top of the bin 5, near the junction of the vertical track stretch 62 with the inclined track stretch 63.

The track 56 comprises parallel, laterally opposite channel sections, each having laterally outwardly projecting flanges 65 (see FIG. 11), and the pair of rollers 55 on each carriage 54 is guidingly confined between the flanges 65 of the channel section at each side of the track 56. To enable the rollers 55 to follow the various curvatures and inclinations of the track 56, each carriage 54 has a pivotal connection 66 with the front end of the elevator frame 13.

As the elevator hoisting cables 47 pull on the front end of the elevator frame 13 during erection of the elevator, and the carriages 54 control movement of the front end of the elevator frame by their cooperation with the track 56, the rear portion of the elevator frame readily follows along because it is mounted on its transport wheels 11.' Since the wheels 11' comprise a tandem axle truck 111 with multiple wheels, that truck has a pivotal connection 68 to the elevator frame 13 such that the front end of that frame can be tilted up to a substantially high angle while all of the wheels 11' remain in firm supporting engagement with the ground.

Initially the front end of the elevator frame 13 is hoisted to a little above its operating position, and while it is held in that superelevated position, a safety latch (not shown) is installed in the track 56, just below each carriage 54. The elevator frame is then lowered through the small distance necessary to engage the safety latches, which thus define the operating position of the elevator 12 and prevent it from sliding back down the track 56. To further secure the elevator in its erected position, the wheels 11' of the elevator unit are braked or chocked. In addition, tension is maintained on the elevator hoisting cables 47, which thus cooperate with the brakes or chocks for the wheels 11' not only to maintain the elevator in its erected position but also to cooperate with the brace struts 33 in supporting the bin 5 against fore-and-aft sway.

The procedure for taking down the silo to restore it to its transport condition is essentially the reverse of the erection procedure described above, and therefore it need not be explained.

From the foregoing description taken with the accompanying drawings it will be apparent that this invention provides a heavy-duty portable silo assembly which is particularly suitable for paving material mixing plants and which is self-erecting in the sense that no crane is needed for setting it up and taking it down. As will also be apparent, the mechanism for erecting the silo assembly of this invention and for lowering it to its transport condition is compact enough to be carried on the two trailer units which transport the assembly, and it comprises readily available components, including conventional hydraulic cylinder jacks that are employed for raising and lowering the storage bin. Finally, notwithstanding the lower cost of the apparatus and the speed and efficiency with which it can be erected and dismantled, the silo assembly of this invention assures a high degree of safety to the personnel who erect and dismantle it.

I claim:

1. A self-erecting portable silo assembly comprising a bin for storage of paving mix and the like that is substantially cylindrical and has a bin axis and top and bottom ends spaced along said axis, front and rear supporting means for supporting the bin in an erected upright position with its bottom end elevated, and a rigid horizontally elongated bin frame to which bottom ends of the supporting means are attached when the bin is erected and on which the bin is also supported in a transport position wherein the bin axis is substantially horizontal and the bin has a rear side uppermost and its top end near a front end of said frame, said assembly being characterized by:

A. cooperating means on the bin, near a front side thereof and its bottom end, and on said bin frame, intermediate the front and rear ends thereof, providing a releasable connection between the bin and said frame that defines a first horizontal swinging axis transverse to said bin axis and in fixed relation to the bin frame about which the bin can swing between its transport position and an intermediate position in which the bin axis is inclined to the horizontal;

B. rear support connection means operative when the bin is in said intermediate position to provide
   (1) a rigid connection between an upper portion of said rear supporting means and the bin, near the rear side thereof, and
   (2) a detachable pivot connection between a lower portion of said rear supporting means and said bin frame, located between the front and rear end of the bin frame and near the rear end thereof, defining a second swinging axis which is in fixed relation to the bin frame and parallel to said first swinging axis and about which the bin can swing between said intermediate position and its upright position;

C. a cylinder jack that is axially extensible and retractable, for swinging the bin upward and downward, respectively;

D. upper jack connection means providing a pivotal connection between the bin and an upper end of said jack;

E. lower jack connection means whereby a lower end of said jack can be pivotally connected to said bin frame alternatively
   (1) at a first location spaced forwardly along said frame a substantial distance from said first swinging axis, enabling said jack to swing the bin between its transport and its intermediate positions, and
   (2) at a second location spaced rearwardly along the frame from said first location, enabling said jack to swing the bin between its intermediate and its upright positions; and F. front support connection means operative when the bin is in said upright position to provide
   (1) a connection between an upper portion of said front supporting means and the bin, near the front side thereof, and
   (2) a detachable connection between a lower portion of said front supporting means and the bin frame.

2. The silo assembly of claim 1, further characterized by:

G. a slat conveyor elevator comprising an elevator frame having
   (1) ground engaging wheels under a rear portion thereof and
   (2) roller means at a front end thereof;

H. a track on said bin frame that is engageable by said roller means and is operative when the bin is in its upright position to guide the front end of the elevator frame upwardly along the rear side of the bin, thence obliquely upwardly and forwardly a substantial distance across the top end of the bin to an operative position;

I. a winch on the front end of the bin frame;

J. cable means connectable between said winch and the front end of the elevator frame; and K. cable guide means supported by the top of the bin and by which the cable means is trained across the bin for hoisting the front end of the elevator frame to its operative position.

3. The silo assembly of claim 1, further characterized by: said front support connection means providing a pivotal connection between said bin and the front supporting means whereby said front supporting means remains in a substantially horizontally extending attitude while the bin is swung between its transport and its intermediate positions.

4. The silo assembly of claim 1, further characterized by:
   (1) said rear supporting means comprising a pair of rear legs, and
   (2) said rigid connection
      (a) disposing each of said rear legs lengthwise substantially parallel to the bin axis and
      (b) comprising a pair of diagonal brace struts, one for each of said rear legs, each said brace strut having at one of its ends a detachable connection with its rear leg, near the bottom of the latter, and at its other end a detachable connection with the bottom of the bin, near the front side of the bin.

5. The silo assembly of claim 4, further characterized by:
   detachable brace strut connecting means on said bin frame, spaced forwardly from the front support connecting means, and on said front supporting means, at the upper portion thereof, to which said brace struts can be connected when the bin is in its upright position for bracing the bin against forward and rearward displacement.

6. The silo assembly of claim 1, further characterized by:
   said upper jack connection means being shiftable forwardly and rearwardly along the bottom of the bin to be alternatively detachably securable in
   (1) a rearward position near the rear side of the bin, occupied during swinging of the bin between its upright and its transport positions, and
   (2) a forward position near the front side of the bin, occupied when the bin is in its upright position.

7. The silo assembly of claim 1, further characterized by:
   said lower jack connection means comprising
   (1) a shoe to which said jack is pivotally connected;
   (2) an elongated track on said bin frame along which said shoe is guidingly confined to forward and rearward sliding motion between said first and said second locations, and
   (3) anchoring means detachably engageable with said shoe and with fixed means on the bin frame for releasably confining said shoe at each of said locations.

8. A self-erecting portable silo assembly comprising a bin for storage of paving mix and the like that is substantially cylindrical and has a bin axis, top and bottom ends spaced along said axis and front and rear sides, a pair of front legs and a pair of rear legs upon which the bin is supported when it is in an erected upright position with the bin axis vertical, and a rigid horizontally elongated bin frame to which bottom ends of said legs are connected when the bin is in its upright position and on which the bin is also supported when it is in a transport position wherein the bin axis is horizontal, its front side is lowermost and adjacent to said bin frame, and its top end is near a front end of said frame, said silo assembly being characterized by:
  A. said rear legs having upper ends rigidly connected to a bottom portion of the bin, adjacent to the rear side thereof, and extending lengthwise substantially parallel to the bin axis;
  B. cooperating means on the bin frame, intermediate its front and rear ends, and on the bin, adjacent to the bottom end and the front side thereof, providing a releasable pivot connection between the bin and the bin frame that defines a first horizontal axis which is in fixed relation to the bin frame and about which the bin can swing between its transport position and an intermediate position wherein the bin axis is inclined to the horizontal and the lower ends of said rear legs are adjacent to said bin frame;
  C. rear leg connection means on said bin frame, located between the front and rear end of the bin frame and near the rear end thereof, engageable with the lower ends of said rear legs when the bin is in its said intermediate position to releasably pivotably secure the rear legs to the bin frame and define a second horizontal axis which is in fixed relation to the bin frame and about which the bin can swing between its intermediate position and its upright position;
  D. a cylinder jack that is axially extensible for swinging the bin upward and retractable for swinging the bin downward;
  E. upper jack connection means providing a pivotal connection between the bin and an upper end of said jack;
  F. lower jack connection means whereby a lower end of said jack can be pivotably connected to said bin frame alternatively
    (1) at first location spaced forwardly along said bin frame a substantial distance from said first horizontal axis, enabling said jack to swing the bin between its transport and its intermediate positions, and
    (2) at a second location spaced rearwardly along the bin frame from said first location, enabling said jack to swing the bin between its intermediate and its upright positions;
  G. said front legs having, at upper ends thereof, pivot connections to the bottom portion of the bin, near the front side thereof, to enable said front legs to maintain a horizontal attitude adjacent to the frame as the bin swings between its transport and its intermediate positions; and
  H. front leg securement means on said bin frame to which the lower ends of said front legs are detachably securable when the bin is in its upright position.

9. A self-erecting silo assembly comprising a bin for storage of paving mix and the like having top and bottom ends and which, when in an erected upright position, is supported on a pair of upright front legs that have upper ends connected to the bottom portion of the bin adjacent to a front side thereof and a pair of upright rear legs that have upper ends connected to said bottom portion of the bin adjacent to a rear side thereof, and a rigid horizontally elongated bin frame upon which said bin is supported in a horizontal transport position with its front side lowermost and adjacent to the frame and with its tip end near a front end of the frame, said silo assembly being characterized by:
  A. cooperating means on the bin frame and on the bin, adjacent to the front side and the bottom end of the bin, providing a releasable pivot connection between the bin and the bin frame that defines a first horizontal axis which is in fixed relation to the bin frame and about which the bin can swing between its transport position and an intermediate position wherein said front and rear sides of the bin are inclined to the horizontal and the lower ends of said rear legs are adjacent to the bin frame, near a rear end thereof;
  B. rear leg securement means on the bin frame located between the front and rear end of the bin frame, engageable with the lower ends of the rear legs when the bin is in said intermediate position to releasably connect said rear legs with the bin frame and define a second horizontal axis, parallel to said first horizontal axis and in fixed relation to the bin frame, about which the bin can be swung between its intermediate position and its upright position;
  C. the upper ends of said front legs being pivotally connected to the bottom portion of the bin so that the front legs remain in a substantially horizontal attitude as the bin swings between its transport and its intermediate positions; and
  D. front leg securement means on the bin frame to which the bottom ends of said front legs are detachably securable when the bin is in its upright position.

10. The self-erecting silo assembly of claim 9, further comprising a cylinder jack that is axially extensible for raising the bin to its upright position and axially reretractable for lowering the bin to its transport position, further characterized by:
  E. means defining a pivotal upper jack connection between an upper end of said jack and the bottom portion of the bin; and
  F. means defining a pivotal lower jack connection between a lower end of said jack and the bin frame, said lower jack connection being shiftable forwardly and rearwardly along the bin frame to be releasably securable alternatively
    (1) at a forward location spaced a substantial distance forwardly along the bin frame from said first horizontal axis and at which the jack can swing the bin between its transport and its intermediate positions, and
    (2) at a rearward position, between said forward location and said first horizontal axis and at which the jack can swing the bin between its intermediate and its upright positions.

11. The self-erecting silo assembly of claim 10, further characterized by:
  said means defining a pivotal upper jack connection being shiftable forwardly and rearwardly along said bottom portion of the bin to be releasably securable alternatively
    (1) at a rearward location near the rear side of the bin, for raising and lowering the bin, and
    (2) at a forward location near the front side of the bin, used when the bin is in its upright position.

* * * * *